No. 761,666. Patented June 7, 1904.

UNITED STATES PATENT OFFICE.

JOHN C. FLEMING, OF SUMMIT, NEW JERSEY.

FOOD PRODUCT.

SPECIFICATION forming part of Letters Patent No. 761,666, dated June 7, 1904.

Application filed November 15, 1901. Renewed January 25, 1904. Serial No. 190,492. (No specimens.)

*To all whom it may concern:*

Be it known that I, JOHN C. FLEMING, a citizen of the United States, residing at Summit, in the county of Union and State of New Jersey, have invented certain new and useful Improvements in Food Products, of which the following is a full, clear, and exact description.

My invention is designed to produce a new and wholesome article of diet composed, essentially, of wheat mixed with apple-juice. In producing this food product I have found it convenient to grind or otherwise reduce to a powder the wheat-grains, employing the entire wheat product, although, if desired, the outer covering, consisting principally of a woody or fibrous sheath, may be removed. To this pulverized wheat (which may be reduced to the finely-divided state of flour or not, as desired) is added enough unfermented apple-juice, preferably freshly expressed, to make the mixture a pasty mass sufficiently thick to be shaped into tablets or cakes. Having been so shaped, the tablets are baked in an oven in order to liberate all the watery portions of the fruit-juice and to dry the mixture thoroughly, thereby leaving in combination with the nutritive properties of the wheat the active principle of the apple, composed for the most part of sugar and free acid, with smaller amounts of albuminous substances and salts. This drying also avoids the danger of fermentation of the food product when taken into the stomach.

Any suitable means for grinding the wheat may be employed, as well as any receptacle for mixing and drying the compound.

The relative proportions of the wheat flour or grits and apple-juice may be varied considerably, the desideratum being to get as much apple-juice in the mixture as it will take up without reducing it to a fluid or semifluid condition.

What I claim as my invention is—

1. As a new article of manufacture, a baked article of food composed of farinaceous material having apple-juice incorporated therein, substantially as described.

2. As a new article of food, a baked tablet composed of comminuted wheat having apple-juice incorporated therein, substantially as described.

JOHN C. FLEMING.

Witnesses:
   M. LAWSON DYER,
   DRURY W. COOPER.